United States Patent
Li

(10) Patent No.: US 10,159,008 B2
(45) Date of Patent: Dec. 18, 2018

(54) TERMINAL POSITIONING

(71) Applicant: NEW H3C TECHNOLOGIES CO., LTD., Hangzhou (CN)

(72) Inventor: Hua Li, Beijing (CN)

(73) Assignee: New H3C Technologies Co., Ltd., Hangzhou (CN)

( * ) Notice: Subject to any disclaimer, the term of this patent is extended or adjusted under 35 U.S.C. 154(b) by 0 days.

(21) Appl. No.: 15/744,419

(22) PCT Filed: Jul. 20, 2016

(86) PCT No.: PCT/CN2016/090626
§ 371 (c)(1),
(2) Date: Jan. 12, 2018

(87) PCT Pub. No.: WO2017/012541
PCT Pub. Date: Jan. 26, 2017

(65) Prior Publication Data
US 2018/0199224 A1     Jul. 12, 2018

(30) Foreign Application Priority Data

Jul. 21, 2015  (CN) .......................... 2015 1 0430795

(51) Int. Cl.
*H04W 64/00*     (2009.01)
*H04W 24/10*     (2009.01)
(Continued)

(52) U.S. Cl.
CPC .............. *H04W 24/10* (2013.01); *G01S 5/02* (2013.01); *G01S 13/74* (2013.01); *H04W 4/02* (2013.01); *H04W 8/22* (2013.01); *H04W 24/08* (2013.01)

(58) Field of Classification Search
CPC combination set(s) only.
See application file for complete search history.

(56) References Cited

U.S. PATENT DOCUMENTS

| 7,286,833 B2 | 10/2007 | Friday et al. |
| 2011/0149850 A1* | 6/2011 | Sashihara ............. H04W 48/16 370/328 |

(Continued)

FOREIGN PATENT DOCUMENTS

| CN | 1674541 A | 9/2005 |
| CN | 103188791 A | 7/2013 |

(Continued)

OTHER PUBLICATIONS

ISA State Intellectual Property Office of the People's Republic of China, International Search Report and Written Opinion Issued in Application No. PCT/CN2016/090626, dated Sep. 30, 2016, WIPO, 4 pages.

(Continued)

*Primary Examiner* — Quan M Hua
(74) *Attorney, Agent, or Firm* — McCoy Russell LLP

(57) ABSTRACT

In this example, a method and an AP for positioning a terminal are provided. And wherein, when receiving a probe request sent by a terminal, the AP determines whether the terminal is a non-associated terminal or not according to acquired terminal status information. When determining the terminal as a non-associated terminal, the AP may measure round trip time (RTT) for the terminal. The AP may send the measurement result to a server, so that the server may position the terminal according to the measurement result.

14 Claims, 4 Drawing Sheets

(51) Int. Cl.
G01S 5/02 (2010.01)
G01S 13/74 (2006.01)
H04W 4/02 (2018.01)
H04W 8/22 (2009.01)
H04W 24/08 (2009.01)

(56) References Cited

U.S. PATENT DOCUMENTS

| | | |
|---|---|---|
| 2013/0300607 A1 | 11/2013 | Mansour |
| 2014/0003310 A1* | 1/2014 | Kamath .................. G01S 1/20 370/311 |
| 2014/0003406 A1 | 1/2014 | Kamath et al. |
| 2017/0230988 A1* | 8/2017 | Zhou .................. H04W 72/121 |

FOREIGN PATENT DOCUMENTS

| | | |
|---|---|---|
| CN | 104349453 A | 2/2015 |
| CN | 104363585 A | 2/2015 |
| CN | 104581619 A | 4/2015 |
| WO | 2005096568 A1 | 10/2005 |

OTHER PUBLICATIONS

European Patent Office, Extended European Search Report Issued in Application No. 16827232.6, dated Jul. 3, 2018, Germany, 17 pages.

* cited by examiner

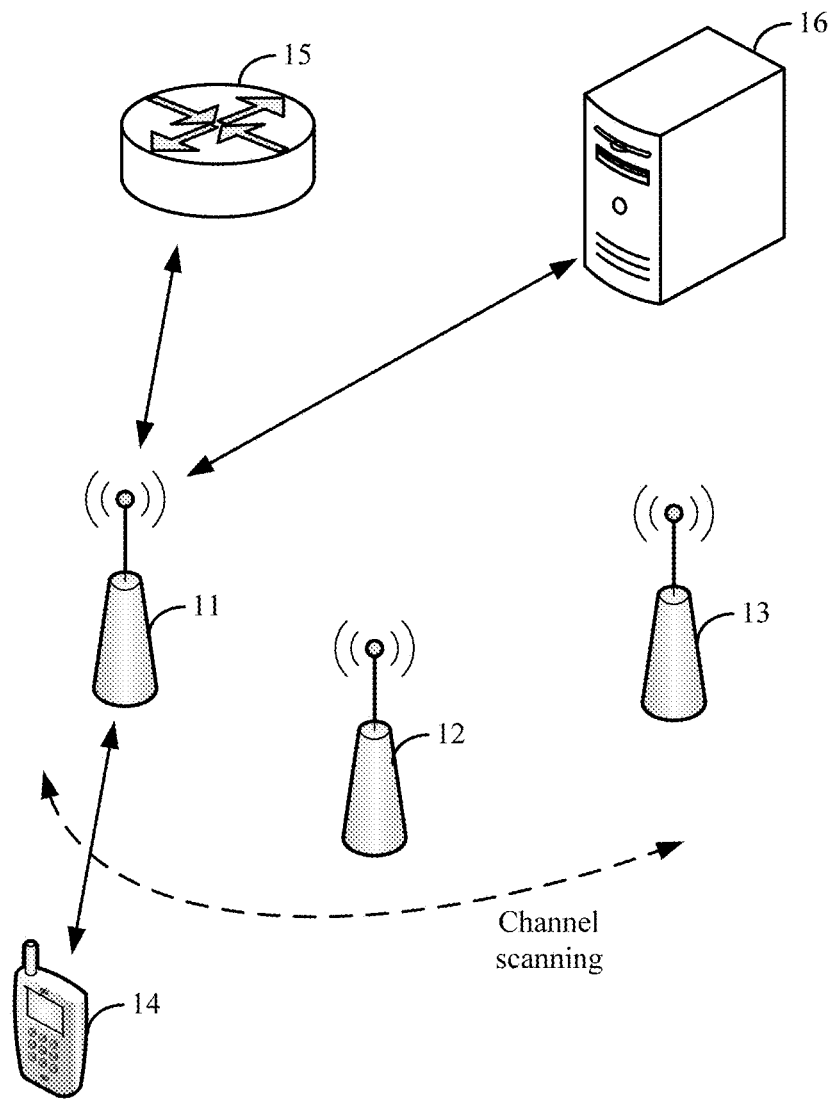

FIG. 1

When receiving a probe request sent by a terminal, an AP may determine whether the terminal is a non-associated terminal according to acquired terminal status information — 201

When determining the terminal as a non-associated terminal, the AP may measure RTT for the terminal, and send the measurement result to a server so that the server may position the terminal according to the measurement result — 202

FIG. 2

TERMINAL POSITIONING

CROSS-REFERENCE TO RELATED APPLICATIONS

The present application is a U.S. National Phase of International Patent Application Serial No. PCT/CN2016/090626 entitled "TERMINAL POSITIONING," filed on Jul. 20, 2016. International Patent Application Serial No. PCT/CN2016/090626 claims priority to Chinese Patent Application No. 201510430795.4, filed on Jul. 21, 2015. The entire contents of each of the above-cited applications are hereby incorporated by reference in their entirety for all purposes.

BACKGROUND

With application of mobile Internet and big data, positioning technologies based on Wireless Local Area Networks (WLAN) may be applied in numerous industries. A WLAN-based positioning technology may include a positioning method of measuring Round Trip Time (RTT). An active measurement mode may be used for RTT positioning, namely, an access point (AP) in a network may actively send a measurement request packet to a to-be-positioned terminal, receive a measurement response fed back by the terminal and calculate RTT from sending the measurement request packet to receiving the response to the packet. This active measurement mode may merely support positioning of a terminal associated to networks (hereinafter referred to as an associated terminal). To a terminal not associated to networks (hereinafter referred to as a non-associated terminal), since a working channel of the non-associated terminal is not fixed and is likely unable to feed back a measurement response, the RTT mode is difficult to support positioning of the non-associated terminal.

BRIEF DESCRIPTION OF THE DRAWINGS

FIG. 1 is a schematic diagram showing a scenario of positioning a terminal according to an example of this disclosure;

FIG. 2 is a flowchart showing a method for positioning a terminal according to an example of this disclosure;

DETAILED DESCRIPTION OF THE EMBODIMENTS

Figure 3:
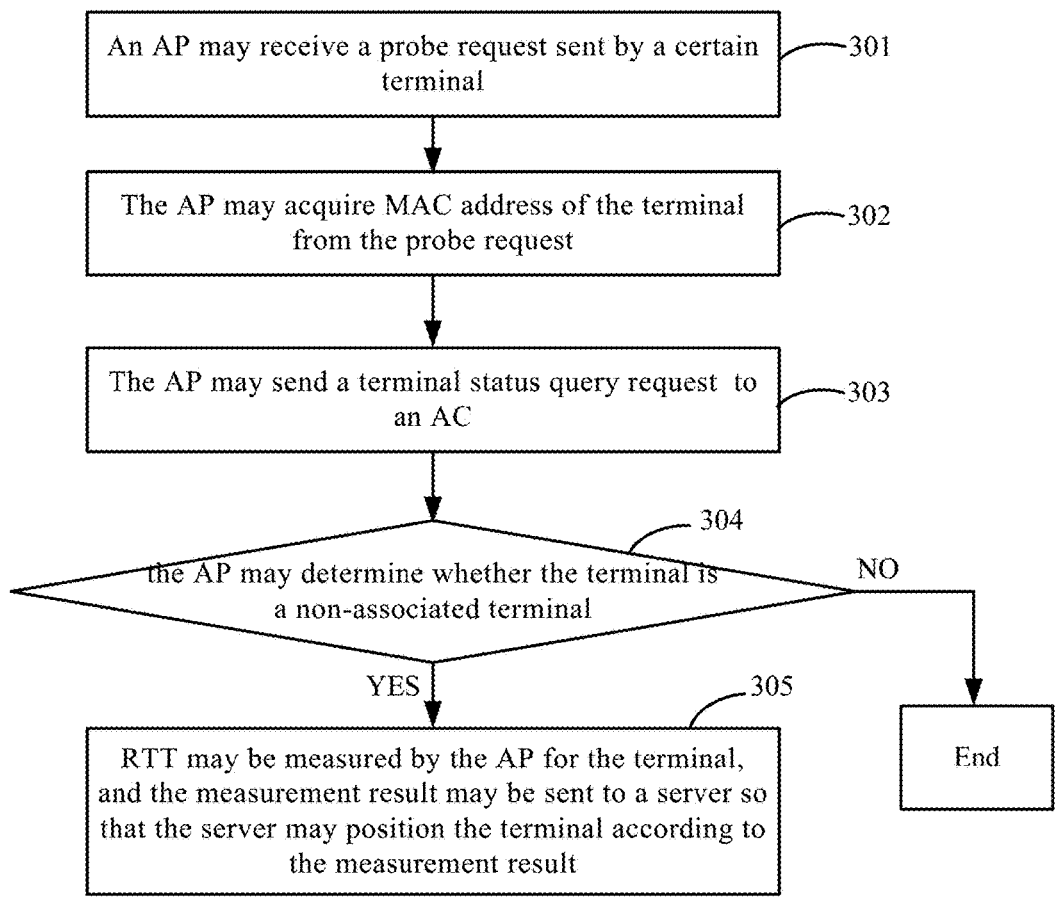
FIG. 3 is a flowchart showing how an AP queries an access controller (AC) for an associated status of a terminal according to an example of this disclosure.

Description will now be made in detail to exemplary examples, examples of which are illustrated in the accompanying drawings. The following description refers to the accompanying drawings in which the same reference numbers in different drawings represent the same or similar elements unless otherwise represented. The implementations set forth in the following description of exemplary examples do not represent all implementations consistent with this disclosure. Instead, they are merely examples of apparatuses and methods consistent with some aspects related to this disclosure as recited in the appended claims.

In combination with description of Background, in the related art, consideration is given in the RTT mode in which a server scheduling measurement method is used for positioning a non-associated terminal. When a certain AP in networks receives a probe request sent by a non-associated terminal, the AP may report information of the terminal (for example, an MAC address of the terminal and a channel on which the terminal is operating) to a positioning server. The positioning server may instruct multiple APs nearby the terminal to measure RTTs for the terminal, and position the terminal according to the measurement results reported by the APs. However, a channel of the non-associated terminal is not fixed, the time during which the terminal is operating on one channel is likely relatively short, whereas a scheduling process of the server may take a long time. Therefore, the server may be unable to respond in time, and the terminal may be likely to get unassociated from the APs when the instruction of the server reaches the APs, which causes the APs unable to perform a positioning measurement.

This disclosure provides a method for positioning a terminal, which may position a non-associated terminal by using a positioning mode based on RTT measurement. As shown in FIG. 1 which illustrates a scenario of terminal positioning, multiple access points (APs) used as wireless access devices may be included in an RTT positioning network. For example, FIG. 1 illustrates part of APs, such as AP 11, AP 12 and AP 13. A to-be-positioned terminal 14 may be associated to one of the APs so as to access a wireless network.

An access controller (AC) 15 and a server 16 may be further included in the network, wherein the AC 15 may be used for management of an AP. For example, when the terminal 14 is associated to the AP 11, the AP 11 may report associated information of the terminal 14 to the AC 15 so that the AC 15 may record that the terminal 14 has been associated to the AP 11. In other words, the AC 15 may store terminal status information, for example, whether a certain terminal has been associated to an AP. The server 16 may perform a positioning calculation of the terminal. For example, the AP 11 may measure RTT for the terminal to obtain signal round trip time between the terminal and the AP and reports a measurement result to the server 16, which calculates a location of the terminal according to the measurement result.

In this example, supposing the terminal 14 in FIG. 1 has not been associated to any AP yet and thus belongs to a non-associated terminal, then the terminal 14 may scan surrounding available networks on different channels, and periodically send a probe request. Three APs illustrated in FIG. 1 may periodically receive packets from the terminal 14. For example, at a certain moment the AP 11 receives a probe request sent by the terminal 14. However, after a specific period, the AP 11 may not receive any probe request from the terminal 14. This is because the terminal 14 has moved onto a channel of the AP 12 so that it is the AP 12 instead of the AP 11 that may receive a probe request from the terminal 14. The method for positioning a terminal in this disclosure will be used for describing how to position a non-associated terminal.

FIG. 2 illustrates a flowchart of the method for positioning a terminal performed by an AP, which may include following blocks 201-202.

At block 201, when receiving a probe request sent by a terminal, an AP may determine whether the terminal is a non-associated terminal or not according to acquired terminal status information.

For example, each AP in a network may determine whether a received packet is a probe request by monitoring on its own working channel. If the received packet is a probe request, the AP may continue determining whether the terminal sending the packet is a non-associated terminal or not, and then execute block 202 when the terminal is determined as a non-associated terminal.

At this block, the AP may determine whether the terminal is a non-associated terminal according to, for example, the terminal status information acquired from the AC. For example, as above described, the AC may store the terminal status information which may at least include whether a certain terminal has been associated to the AP. In this way, the AP may determine whether the terminal sending the probe request is a non-associated terminal by querying the terminal status information stored in the AC.

At block 202, when the terminal is determined as a non-associated terminal, RTT is measured for the terminal, and the measurement result may be sent to a server so that the server may position the terminal according to the measurement result.

As can be seen from the above, in this example, the AP may detect whether the terminal is a non-associated terminal after receiving the probe request sent by the terminal, and measure RTT for the terminal to contribute to positioning the terminal when determining that the probe request is sent by a non-associated terminal.

In this manner, it is up to the AP itself to determine whether the terminal is a non-associated terminal or not, and RTT may be measured for the terminal so as to position the terminal when determining that the terminal is a non-associated terminal. Compared with the mode in which the AP waits for a scheduling instruction from a server, the AP may execute processing as shown in FIG. 2 within a comparatively short time when a non-associated terminal stays in a channel of the AP since the AP may quickly determine the non-associated terminal by itself, thereby contributing to positioning the terminal quickly.

In an example, a manner for detecting by the AP whether the terminal is a non-associated terminal may be that the AP queries from the AC whether the terminal is a non-associated terminal. This is because the AC may store terminal status information including an associated status of the terminal, for example, the AC may record that the terminal is associated to a certain AP. If the terminal is not associated to any AP, it may be regarded that the terminal is a non-associated terminal.

FIG. 3 illustrates schematic processes of a method for querying by an AP a terminal associated status from an AC. As shown in FIG. 3, the method may include blocks 301-305.

At block 301, the AP may receive a probe request sent by a certain terminal. At block 302, the AP may acquire MAC address of the terminal from the probe request. At block 303, the AP may send a terminal status query request carrying the MAC address of the terminal obtained at block 302 to an AC so that the AC may determine an associated status of the terminal by querying terminal status information stored in the AC according to the MAC address.

At block 304, the AP may determine whether the terminal is a non-associated terminal according to a result fed back from the AC. Block 305 may be executed if the terminal is determined as a non-associated terminal. At block 305, RTT may be measured by the AP for the terminal, and the measurement result may be sent to a server so that the server may position the terminal according to the measurement result. This procedure may be ended if at block 304 the terminal is determined by the AP as an associated terminal.

If the AP queries an AC about a terminal status every time after the AP receives a probe request sent by the terminal, the query speed may likely become slower. For example, when network condition is poorer, a feedback speed of the AC may likely be affected by the network. Therefore, to improve an efficiency of the AP in determining the associated status of the terminal, the terminal status information may also be acquired locally. In another example, the AP may also store a non-associated terminal list locally. The non-associated terminal list may store information of one or more non-associated terminals, for example, MAC addresses of each non-associated terminal. For example, {mac_1, mac_2, mac_3, . . . }, this list stores MAC addresses of multiple non-associated terminals. For example, the non-associated terminal list may be stored in a local cache of the AP. The AP may query the associated status of the terminal according to the list, and a local query may improve a query efficiency compared with querying from AC.

Figure 4:
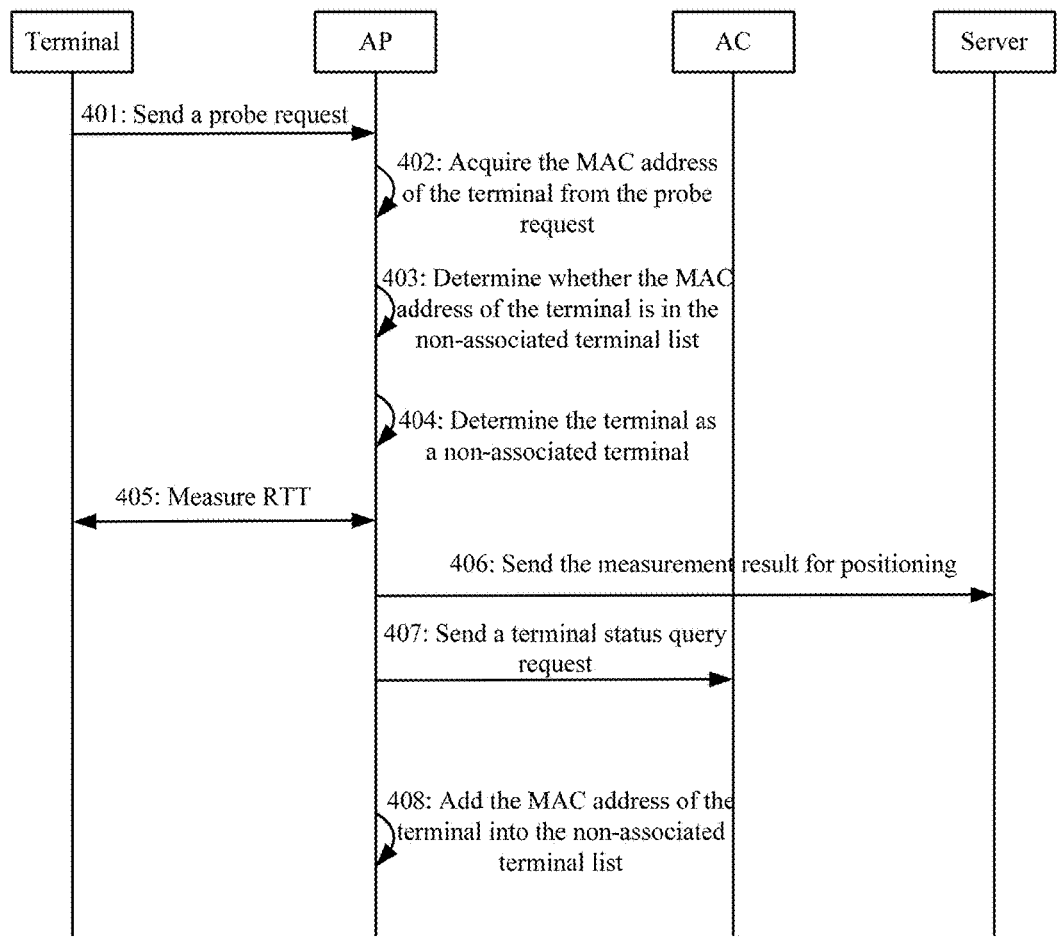
FIG. 4 is a flowchart showing how an AP determines a terminal status by querying a local list according to an example of this disclosure.

For example, the AP may employ the manner in the example of FIG. 4, in which a local non-associated terminal list is queried first. When the MAC address of the terminal is not found in the local non-associated terminal list, the associated status of the terminal may be queried from the AC. Compared with the manner as shown in FIG. 3, the manner as shown in FIG. 4 may more quickly and accurately query the associated status of the terminal since it combines locally querying the non-associated terminal list with querying the associated status of the terminal from the AC.

In addition, the non-associated terminal list locally stored in the AP may be generated by the AP according to a feedback result queried from the AC, which is equivalent to that the AP determines a non-associated terminal according to the terminal status information stored in the AC. For example, when the AP queries from the AC and determines that the terminal sending a probe request packet is a non-associated terminal, the MAC address of the non-associated terminal may be stored in a local non-associated terminal list. And when another probe request is received again subsequently, it may be determined whether the terminal is a non-associated terminal according to the local non-associated terminal list.

For example, referring to the example in FIG. 4, at block 401, the terminal may send a probe request to the AP. At block 402, the AP may acquire the MAC address of the terminal carried in the probe request, and may determine, at block 403, whether the MAC address of the terminal is in the local non-associated terminal list. If the MAC address is recorded in the non-associated terminal list, at block 404 the terminal may be determined as a non-associated terminal hereby. The AP may proceed with processes at blocks 405 and 406, wherein, at block 405 RTT may be measured for the terminal, and at block 406 the measurement result may be sent to a server so that the server may position the terminal according to the measurement result.

However, if the non-associated terminal list does not include the MAC address of the terminal, the AP may execute block 407 and send a terminal status query request carrying the MAC address to the AC so as to query the associated status of the terminal corresponding to the MAC address from the AC. Afterward, the AP may determine whether the terminal is an associated terminal according to the result fed back from the AC. The AP may end the procedure if the terminal is determined as an associated terminal. However, if the terminal is determined as a non-associated terminal, the AP may add, at block 408, the MAC address of the terminal into the local non-associated terminal list for use in next time. For example, when another probe request of the terminal is received again, the terminal may be determined as a non-associated terminal by querying the non-associated terminal list without querying from the AC, thereby improving the efficiency. After the terminal is determined as a non-associated terminal at block 408, the AP may immediately measure RTT for the terminal, namely, execute processing at blocks 405 and 406.

As can be seen from the above, the local non-associated terminal list of the AP may be generated in the manner according to the example in FIG. 4, and the MAC address of the determined non-associated terminal may be added in the local non-associated terminal list according to a query result from the AC. For example, in the beginning, the locally-stored non-associated terminal list of the AP may be null, namely, no MAC address of any terminal is recorded. When the AP receives a probe request sent by the terminal for the first time, the AP may query to the AC whether the terminal is a non-associated terminal since the non-associated terminal list is null. However, if the terminal is determined as a non-associated terminal according to a feedback result from the AC, the AP may add the MAC address of the terminal into the non-associated terminal list. In this way, when the AP receives a probe request sent from the terminal corresponding to the MAC address next time, the terminal may be directly determined as a non-associated terminal according to the local non-associated terminal list, thereby improving the query efficiency.

The foregoing non-associated terminal list may be created when, for example, the positioning function of the AP is turned on, and may be deleted when the positioning function is turned off. When the positioning function of the AP is turned on next time, the non-associated terminal list may be regenerated according to the foregoing method for generating the list.

In addition, since a non-associated terminal may likely scan quickly on different channels, the non-associated terminal may move to somewhere else, namely have not operated on a working channel of the AP, but the MAC address of the non-associated terminal may continue occupying entry resources of the non-associated terminal list in the local cache of the AP, which may cause larger and larger accumulated entries and a lower query efficiency. To prevent that, in this example, MAC addresses of terminals having never been accessed yet over a period of time may be deleted from the non-associated terminal list in the cache by using a method for deleting aging entries.

For example, an aging timer with a period of T0 may be started for each entry in the non-associated terminal list of the cache, namely for each MAC address in the non-associated terminal list. When the AP queries a certain MAC address in the non-associated terminal list, the aging timer for the MAC address may be refreshed. For example, when the MAC address is queried, the aging timer for the MAC address may be cleared. If the aging timer for a certain entry in the non-associated terminal list expires, which means the AP never queries the MAC address of the entry within the period of T0, the AP may delete the entry (specifically, the MAC address) from the non-associated terminal list.

In addition to the foregoing entry aging policy, in this example, the non-associated terminal list may also be periodically updated. Terminal status may be dynamically variable. For example, at a current moment a terminal is a non-associated terminal, but at a next moment the terminal may likely join a network by associating to an AP. Conversely, the terminal may change from an associated status to a non-associated status. Therefore, terminal status may be periodically updated to improve accuracy in querying the associated status of a terminal. However, in view that the associated status of a terminal generally does not frequently change, thus a moderate update period may be provided according to the actual situation.

For example, an update timer with a period of T1 may be started for the non-associated terminal list. When the update timer reaches time T1, the AP may send a terminal status updating request carrying each MAC address in the non-associated terminal list to an AC so as to query to the AC whether the associated status of a terminal corresponding to each MAC address in the non-associated terminal list changes, namely to determine whether a terminal corresponding to each MAC address has changed to an associated terminal. If a certain terminal has been associated to an AP, associated information of the terminal may be recorded in the AC.

If the associated status of a terminal corresponding to a certain entry in the non-associated terminal list is determined to remain unchanged according to a result fed back from the AC, the entry in the non-associated terminal list may remain unchanged correspondingly. However, if it is determined that a certain entry (specifically a terminal corresponding to an MAC address) in the non-associated terminal list has become an associated terminal according to a result fed back by the AC, namely, the associated status of a terminal corresponding to the MAC address changes, the AP may delete the MAC address from the non-associated terminal list.

In still another example, since deployment density of APs applied for WLAN positioning generally is relatively large, at the same moment multiple APs in a network may be likely located on the same channel, and the multiple APs located on the same channel may likely receive a probe request sent from a non-associated terminal. In such a case, APs farther away from the non-associated terminal may be unnecessary to participate in RTT measurement. Based on this, in this example, before RTT is measured for the terminal after an AP receives a probe request sent by the terminal, it may be first determined whether the signal strength of the probe request reaches a preset strength threshold. If it is determined that RSSI (Received Signal Strength Indication) of the probe request reaches the preset strength threshold (for example, higher than or equal to the threshold), the AP may proceed with subsequent procedures, including: continuing determining whether the terminal is a non-associated terminal and performing an RTT measurement, etc. The threshold may be set in combination with density of APs deployed in an application network. APs farther away from the to-be-positioned non-associated terminal may be filtered out by using this manner.

In still another example, when an AP performs an RTT measurement on a terminal determined as a non-associated terminal, the terminal may likely not feed back a response to the AP, so that it is impossible for the AP to obtain RTT corresponding to the terminal by measurement. Then the AP may report RSSI information of a probe request sent by the terminal, as a measurement result, to a server, so that the server may position the terminal according to the RSSI information reported by the AP. Of course, in addition to the RSSI information, the measurement result reported by the AP to the server may further include other information such as the MAC address of the terminal, etc.

The terminal measuring and positioning method of this disclosure may allow an AP to support positioning a non-associated terminal as well as positioning an associated terminal, which may improve competitiveness of a positioning manner based on RTT measurement, and meet market needs. In addition, there may be a little difference between a manner for positioning a non-associated terminal and a manner for positioning an associated terminal for the server. Therefore, when the AP reports the RTT measurement result to the server, the AP may report the associated status of the terminal as well, for example, identifying the terminal to be a non-associated terminal. Thus, the server may perform special processing for the non-associated terminal in terms of positioning calculation, data analysis and graphical display. For example, the server may give proper fine tuning and compensating in positioning calculation according to the non-associated status of the terminal, time difference of positioning data sent by different APs and other information.

Figure 5:
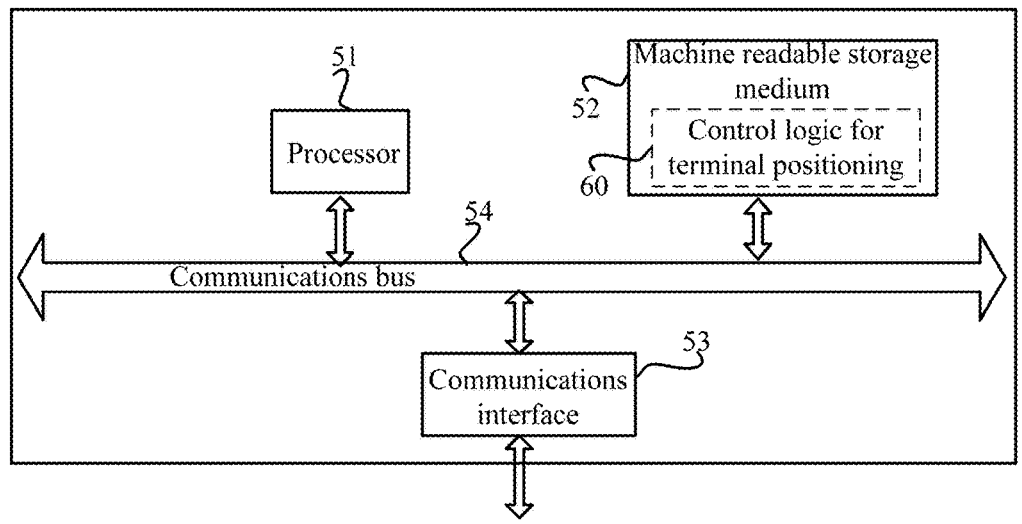
FIG. 5 is a schematic diagram showing a hardware structure of an AP according to an example of this disclosure.

In an example of this disclosure, a schematic diagram of hardware structure of an AP is provided. As shown in FIG. 5, the AP may include a processor 51, a machine readable storage medium 52, a communications interface 53 and a communications bus 54. Communications among the processor 51, the machine readable storage medium 52, the communications interface 53 may be achieved by means of the communications bus 54. The foregoing terminal positioning method based on RTT measurement may be implemented by executing, by the processor 51, machine-executable instructions, stored in the machine readable storage medium 52, corresponding to a control logic for terminal positioning.

The machine readable storage medium may be any electronic, magnetic, optical or other physical storage devices, which may contain or store information such as executable instructions or data, etc. For example, the machine readable storage medium may be a random access memory (RAM), a volatile memory, a nonvolatile memory, a flash memory, a memory drive (such as a hard disk drive), a solid state drive, any type of memory disks (such as an optical disk or a DVD and so on), or similar storage medium or a combination thereof. Furthermore, any machine readable storage medium as recited herein may be non-transitory.

Further, the machine readable storage medium 52 may store a control logic 60 for terminal positioning. Functionally divided, the control logic 60 may include a terminal status recognizing module 61 and a terminal positioning and measuring module 62.

The terminal status recognizing module 61 may determine, when a probe request sent by a terminal is received, whether the terminal is a non-associated terminal or not according to acquired terminal status information.

The terminal positioning and measuring module 62 may measure, when the terminal is determined as a non-associated terminal by the terminal status recognizing module, RTT for the terminal, and send the measurement result to a server so that the server may position the terminal according to the measurement result.

Figure 6:
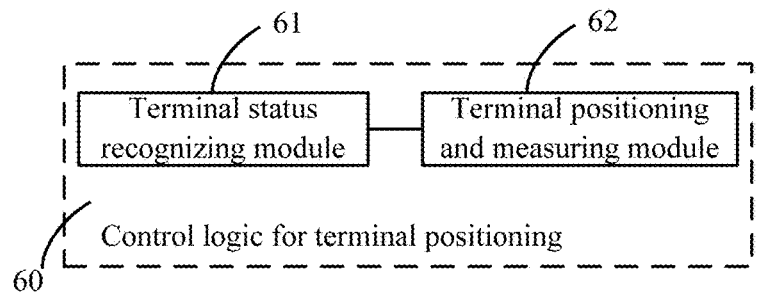
FIG. 6 is a block diagram showing functional modules of a control logic for terminal positioning according to an example of this disclosure.
Figure 7:
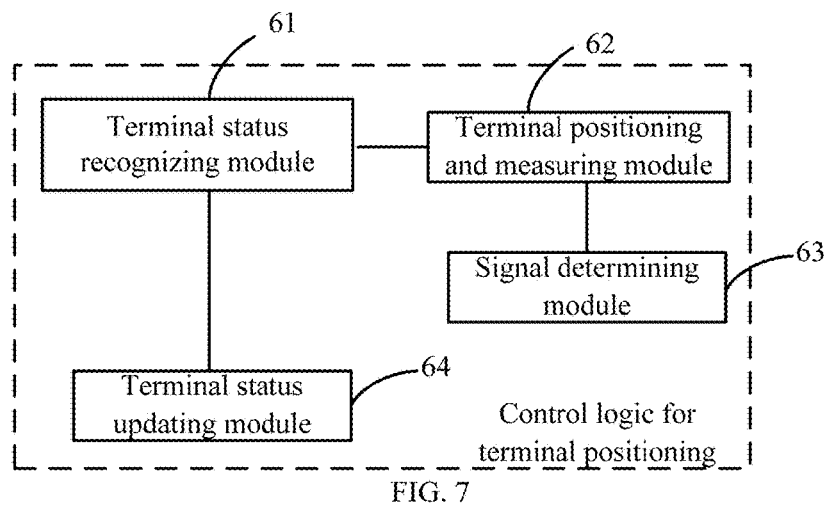
FIG. 7 is a block diagram showing functional modules of a control logic for terminal positioning according to another example of this disclosure.

As shown in FIG. 6, the control logic 60 may further include a signal determining module 63. The signal determining module 63 may determine whether a signal strength of the received probe request reaches a preset strength threshold. When the signal strength of the probe request is determined to reach the preset strength threshold, the terminal positioning and measuring module 62 may continue to measuring the RTT for the terminal.

In an example, the terminal status recognizing module 61 may acquire an MAC address of the terminal from the probe request; send a terminal status query request carrying the MAC address to an AC so that the AC may determine whether the terminal is an associated terminal or a non-associated terminal by querying terminal status information stored in the AC according to the MAC address, and feed the query result back to the terminal status recognizing module 61; and determine whether the terminal is a non-associated terminal according to a query result fed back by the AC.

In another example, the control logic 60 may further include a terminal status updating module 64.

After receiving a probe request sent by the terminal, the terminal status recognizing module 61 may acquire the MAC address of the terminal from the probe request, and query whether the MAC address is in a local non-associated terminal list according to the MAC address of the terminal. When the non-associated terminal list includes the MAC address of the terminal, the terminal status recognizing module 61 may determine the terminal to be a non-associated terminal. When the non-associated terminal list does not include the MAC address of the terminal, the terminal status recognizing module 61 may send a terminal status query request carrying the MAC address to an AC so as to determine whether the terminal is a non-associated terminal according to a query result fed back from the AC. The AC may query terminal status information stored in the AC according to the MAC address, determine whether the terminal is an associated terminal or a non-associated terminal, and feed the query result back to the terminal status recognizing module 61. The terminal status updating module 64 may update the non-associated terminal list according to the query result fed back from the AC to the terminal status recognizing module 61.

In another example, the terminal status updating module 64 may also send a terminal status updating request to the AC when an update timer set for the non-associated terminal list expires. The terminal status updating request may include each MAC address in the non-associated terminal list. When the AC feeds back in response to the terminal status updating request that the terminal corresponding to a MAC address of interest in the non-associated terminal list has become an associated terminal, the terminal status updating module 64 may delete the MAC address of interest from the non-associated terminal list.

Further, the terminal positioning and measuring module 62 may also take a signal strength of the probe request as the measurement result and send the measurement result to the server when no response is received from the terminal during RTT measurement of the terminal.

In this example, the AP may support positioning an associated terminal and a non-associated terminal by means of an RTT measuring and positioning manner.

The examples set forth above are only illustrated as preferred examples of this disclosure, and are not intended to limit this disclosure. All modifications, equivalent substitutions and improvements made within the spirit and principles of this disclosure shall fall within the protection scope of this disclosure.

The invention claimed is:
1. A method for positioning a terminal, comprising:
determining, by an access point (AP), whether a terminal is a non-associated terminal or not according to acquired terminal status information when receiving a probe request sent by the terminal;

measuring, by the AP, round trip time (RTT) for the terminal in a condition that the terminal is determined as a non-associated terminal; and sending, by the AP, a measurement result to a server so that the server positions the terminal according to the measurement result.

2. The method according to claim 1, wherein before measuring the RTT for the terminal, the method further comprises:

determining, by the AP, whether a signal strength of the received probe request reaches a preset strength threshold or not; and continuing, by the AP, to measure the RTT for the terminal in a condition that the signal strength of the probe request reaches the preset strength threshold.

3. The method according to claim 1, wherein said determining whether the terminal is a non-associated terminal or not according to the acquired terminal status information comprises:

acquiring, by the AP, a Media Access Control (MAC) address of the terminal from the probe request;

sending, by the AP, a terminal status query request carrying the MAC address to an access controller (AC) so that the AC determines whether the terminal is an associated terminal or a non-associated terminal by querying terminal status information stored in the AC according to the MAC address, and feeds a query result back to the AP; and determining, by the AP, whether the terminal is a non-associated terminal or not according to the query result fed back from the AC.

4. The method according to claim 1, wherein said determining whether the terminal is a non-associated terminal or not according to the acquired terminal status information comprises:

acquiring, by the AP, a MAC address of the terminal from the probe request;

querying, by the AP, whether the MAC address is in a locally-stored non-associated terminal list according to the MAC address of the terminal;

determining, by the AP, that the terminal is a non-associated terminal in a condition that the locally-stored non-associated terminal list comprises the MAC address of the terminal; and sending, by the AP, a terminal status query request carrying the MAC address to an AC in a condition that the non-associated terminal list does not comprise the MAC address of the terminal so as to determine whether the terminal is a non-associated terminal or not according to a query result fed back from the AC, wherein, the AC determines whether the terminal is an associated terminal or a non-associated terminal by querying terminal status information stored in the AC according to the MAC address, and feeds the query result back to the AP so that the AP updates the non-associated terminal list according to the query result fed back from the AC.

5. The method according to claim 4, further comprising:
sending, by the AP, a terminal status updating request to the AC in a condition that an update timer set for the non-associated terminal list expires, wherein the terminal status updating request comprises each MAC address in the non-associated terminal list; and deleting, by the AP, a MAC address of interest from the non-associated terminal list in case that the AC feeds back that the terminal corresponding to the MAC address of interest in the non-associated terminal list has become an associated terminal in response to the terminal status updating request.

6. The method according to claim 4, further comprising:
deleting, by the AP, a MAC address of interest from the non-associated terminal list in a condition that an aging timer set for the MAC address of interest in the non-associated terminal list expires, wherein, the aging timer is created upon writing the MAC address of interest into the non-associated terminal list.

7. The method according to claim 1, further comprising:
taking, by the AP, a signal strength of the probe request as the measurement result in a condition that no response is received from the terminal during the RTT measurement for the terminal, and sending, by the AP, the measurement result to the server.

8. An access point (AP), comprising a processor and a non-transitory storage medium stored with machine-executable instructions corresponding to a control logic for positioning a terminal, wherein the processor executes the machine-executable instructions to:

determine whether a terminal is a non-associated terminal or not according to acquired terminal status information when receiving a probe request sent by the terminal;

measure round trip time (RTT) for the terminal in a condition that the terminal is determined as a non-associated terminal; and send a measurement result to a server so that the server positions the terminal according to the measurement result.

9. The AP according to claim 8, wherein before measuring the RTT for the terminal, by executing the machine-executable instructions, the processor is further caused to:

determine whether a signal strength of the received probe request reaches a preset strength threshold or not, and continue to measure the RTT for the terminal in a condition that the signal strength of the probe request reaches the preset strength threshold.

10. The AP according to claim 8, wherein, by executing the machine-executable instructions, the processor is further caused to:

acquire a Media Access Control (MAC) address of the terminal from the probe request;

send a terminal status query request carrying the MAC address to an access controller (AC) so that the AC determines whether the terminal is an associated terminal or a non-associated terminal by querying terminal status information stored in the AC according to the MAC address, and feed a query result back to the AP; and determine whether the terminal is a non-associated terminal or not according to the query result fed back from the AC.

11. The AP according to claim 8, wherein, by executing the machine-executable instructions, the processor is further caused to:

acquire a MAC address of the terminal from the probe request;

query whether the MAC address is in a locally-stored non-associated terminal list according to the MAC address of the terminal;

determine that the terminal is a non-associated terminal in a condition that the locally-stored non-associated terminal list comprises the MAC address of the terminal; and send a terminal status query request carrying the MAC address to an AC in a condition that the non-associated terminal list does not comprise the MAC address of the terminal so as to determine whether the terminal is a non-associated terminal or not according to a query result fed back from the AC, wherein, the AC determines whether the terminal is an associated terminal or a non-associated terminal by querying terminal status information stored in the AC according to the MAC address, and feeds the query result back to the AP so that the AP updates the non-associated terminal list according to the query result fed back from the AC.

12. The AP according to claim 11, wherein, by executing the machine-executable instructions, the processor is further caused to:

send a terminal status updating request to the AC in a condition that an update timer set for the non-associated terminal list expires, wherein the terminal status updating request comprises each MAC address in the non-associated terminal list; and delete a MAC address of interest from the non-associated terminal list in case that the AC feeds back that the terminal corresponding to the MAC address of interest in the non-associated terminal list has become an associated terminal in response to the terminal status updating request.

13. The AP according to claim 11, wherein, by executing the machine-executable instructions, the processor is further caused to:

delete a MAC address of interest from the non-associated terminal list in a condition that an aging timer set for the MAC address of interest in the non-associated terminal list expires, wherein, the aging timer is created upon writing the MAC address of interest into the non-associated terminal list.

14. The AP according to claim 8, wherein, by executing the machine-executable instructions, the processor is further caused to:

take a signal strength of the probe request as the measurement result in a condition that no response is received from the terminal during the RTT measurement for the terminal, and send the measurement result to the server.

* * * * *